US012649360B2

(12) United States Patent
Park et al.

(10) Patent No.: US 12,649,360 B2
(45) Date of Patent: Jun. 9, 2026

(54) DRIVING MODULE AND MOBILITY VEHICLE INCLUDING THE SAME

(71) Applicants: Hyundai Motor Company, Seoul (KR); Kia Corporation, Seoul (KR)

(72) Inventors: Jun Hwan Park, Seoul (KR); Hun Keon Ko, Anyang-si (KR); Pan Keun Baek, Osan-si (KR); Hyeon Sik Shin, Hwaseong-si (KR); Seok Ryung Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 769 days.

(21) Appl. No.: 17/749,949

(22) Filed: May 20, 2022

(65) Prior Publication Data

US 2023/0202287 A1 Jun. 29, 2023

(30) Foreign Application Priority Data

Dec. 24, 2021 (KR) ........................ 10-2021-0187800

(51) Int. Cl.
| | |
|---|---|
| B60K 7/00 | (2006.01) |
| B60G 3/00 | (2006.01) |
| B62D 5/00 | (2006.01) |
| B62D 9/00 | (2006.01) |
| B62D 15/02 | (2006.01) |

(52) U.S. Cl.
CPC .............. B60K 7/0007 (2013.01); B60G 3/00 (2013.01); B62D 5/008 (2013.01); B62D 9/00 (2013.01); B62D 15/0235 (2013.01)

(58) Field of Classification Search
CPC ........ B60K 7/0007; B60G 3/00; B62D 5/008; B62D 9/00; B62D 15/0235

USPC ..................................................... 180/13, 413
See application file for complete search history.

(56) References Cited

U.S. PATENT DOCUMENTS

| | | | | |
|---|---|---|---|---|
| 5,450,320 A | * | 9/1995 | Tsubaki | ................... B62D 1/28 |
| | | | | 318/587 |
| 7,938,210 B2 | | 5/2011 | Künzler et al. | |
| 9,102,331 B2 | | 8/2015 | Bluethmann et al. | |
| 10,457,385 B2 | | 10/2019 | Essinger et al. | |
| 2011/0209938 A1 | * | 9/2011 | Basadzishvili | ...... B60K 7/0007 |
| | | | | 180/305 |
| 2014/0318879 A1 | * | 10/2014 | Gillett | ...................... B62K 5/08 |
| | | | | 180/167 |

(Continued)

FOREIGN PATENT DOCUMENTS

| | | | | |
|---|---|---|---|---|
| CN | 109278539 A | * | 1/2019 | .............. B25J 5/007 |
| CN | 111469914 A | * | 7/2020 | ............. B60G 13/00 |

(Continued)

OTHER PUBLICATIONS

Buffer—Definition by Merriam-Webster Online Dictionary. Retrieved from URL https://www.merriam-webster.com/dictionary/buffer on Mar. 3, 2025 (Year: 2025).*

*Primary Examiner* — Valentin Neacsu
*Assistant Examiner* — Tyler Jay Stanley
(74) *Attorney, Agent, or Firm* — Slater Matsil, LLP

(57) ABSTRACT

An embodiment driving module includes a drive unit including a wheel and a drive motor configured to operate the wheel, a suspension unit having a first side coupled to the drive unit, and a steering unit configured to steer the wheel and having a side coupled to a second side of the suspension unit.

17 Claims, 7 Drawing Sheets

(56)          References Cited

U.S. PATENT DOCUMENTS

2021/0023899 A1      1/2021   Wuebbolt-Gorbatenko et al.
2022/0185096 A1*    6/2022   Ameye ................... B62D 7/06

FOREIGN PATENT DOCUMENTS

JP             4635754  B2     2/2011
JP          2013169048  A      8/2013
KR         20080054756  A      6/2008
KR           101409379  B1     7/2014

* cited by examiner

10

300

200

100

10

300

200

100

H

W

DRIVING MODULE AND MOBILITY VEHICLE INCLUDING THE SAME

CROSS-REFERENCE TO RELATED APPLICATIONS

This application claims the benefit of Korean Patent Application No. 10-2021-0187800, filed on Dec. 24, 2021, which application is hereby incorporated herein by reference.

TECHNICAL FIELD

The present disclosure relates to a driving module and a mobility vehicle including the same.

BACKGROUND

A mobility vehicle is equipped with a driving module configured to drive a wheel, a steering module configured to steer the wheel, and a suspension module configured to absorb impact applied through the wheel from the outside.

In this case, to improve the performance of the mobility vehicle, it is necessary to simplify structures of the driving module, the steering module, and the suspension module and improve ride quality by minimizing the unsprung mass provided at a lower end of the suspension module.

Therefore, there is an increasing need to develop a mobility vehicle equipped with a driving module, a steering module, and a suspension module and having a new structure.

SUMMARY

Embodiments of the present disclosure provide a driving module mounted in a mobility vehicle and having a new structure in comparison with the related art, thereby simplifying a structure of the mobility vehicle and improving ride quality.

An exemplary embodiment of the present disclosure provides a driving module including a drive unit including a driving wheel and a drive motor configured to operate the wheel, a suspension unit having one side coupled to the drive unit, and a steering unit configured to steer the wheel and having one side coupled to the other side of the suspension unit.

The suspension unit may be disposed adjacent to one side of the drive unit based on a leftward/rightward width direction.

The steering unit may be disposed above the drive unit and overlap the wheel in a leftward/rightward width direction.

The steering unit may include a steering motor including a steering rotary shaft, a speed reducer coupled to the steering rotary shaft, and an encoder disposed at one side of the steering motor and configured to detect a rotation of the steering rotary shaft.

The steering unit may further include an inner frame having an internal space formed through the inner frame in an upward/downward direction, the inner frame being rotatable together with the speed reducer, and a slip ring disposed in the internal space of the inner frame and having one side coupled to the inner frame.

The steering unit may further include a hollow shaft having a vacant space therein and extending in the upward/downward direction while penetrating the steering motor and the speed reducer, and a first electric wire connected to the slip ring through the vacant space formed in the hollow shaft.

The driving module may further include a second electric wire connected to the slip ring and extending from the slip ring to the suspension unit.

The steering unit may further include a pair of steering bearings configured to respectively support two opposite ends of the steering rotary shaft based on a longitudinal direction of the steering rotary shaft.

The steering unit may further include an outer frame disposed outside the inner frame and configured to surround the inner frame, and a first frame bearing disposed between the inner frame and the outer frame, and the first frame bearing may be disposed outward in a leftward/rightward width direction from the slip ring.

A central axis of the steering rotary shaft and a central axis of the slip ring may be disposed coaxially.

The steering unit may further include a second frame bearing disposed in a region that is included in an upper region of the inner frame and faces the outer frame in the upward/downward direction, one partial region of the second frame bearing may be disposed outward in the leftward/rightward width direction from the speed reducer, and the other partial region of the second frame bearing may be disposed inward in the leftward/rightward width direction from the speed reducer.

The steering unit may further include a buffer member disposed in a region that is included in a lower region of the inner frame and faces the slip ring in the upward/downward direction.

The encoder may be spaced apart upward from the steering bearing.

The suspension unit may include a connection member fixedly coupled to a lower region of the inner frame, a shaft member coupled to a lower region of the connection member and extending in the upward/downward direction, a bushing member into which the shaft member is inserted, the bushing member being movable in the upward/downward direction along the shaft member, and a spring member into which the shaft member is inserted, the spring member being disposed at an upper or lower side of the bushing member.

The suspension unit may further include a guide member disposed between the spring member and the shaft member, and the shaft member may be inserted into the guide member.

The driving module may further include a buffer seat disposed on a lower surface of the connection member and facing the spring member in the upward/downward direction.

The suspension unit may further include a knuckle member having one side coupled to the bushing member and the other side coupled to the drive unit.

The suspension unit may further include a sealing member disposed between the bushing member and the knuckle member.

The suspension unit may be provided in plural, and the plurality of suspension units may include a first suspension unit and a second suspension unit disposed rearward from the first suspension unit.

The suspension unit may be provided in plural, and the plurality of suspension units may be respectively coupled to two opposite sides of the drive unit in a leftward/rightward width direction.

Another exemplary embodiment of the present disclosure provides a mobility vehicle including a vehicle body and a driving module coupled to one side of the vehicle body, in which the driving module includes a drive unit including a driving wheel and a drive motor configured to operate the wheel, a suspension unit having one side coupled to the drive unit, and a steering unit configured to steer the wheel and having one side coupled to the other side of the suspension unit, and in which the suspension unit is disposed adjacent to one side of the drive unit based on a leftward/rightward width direction and provided between the vehicle body and the drive unit based on the leftward/rightward width direction.

According to embodiments of the present disclosure, it is possible to provide the driving module mounted in the mobility vehicle and having a new structure in comparison with the related art, thereby simplifying the structure of the mobility vehicle and improving ride quality.

DETAILED DESCRIPTION OF ILLUSTRATIVE EMBODIMENTS

Hereinafter, a driving module and a mobility vehicle according to embodiments of the present disclosure will be described with reference to the drawings.

Driving Module

Figure 1:
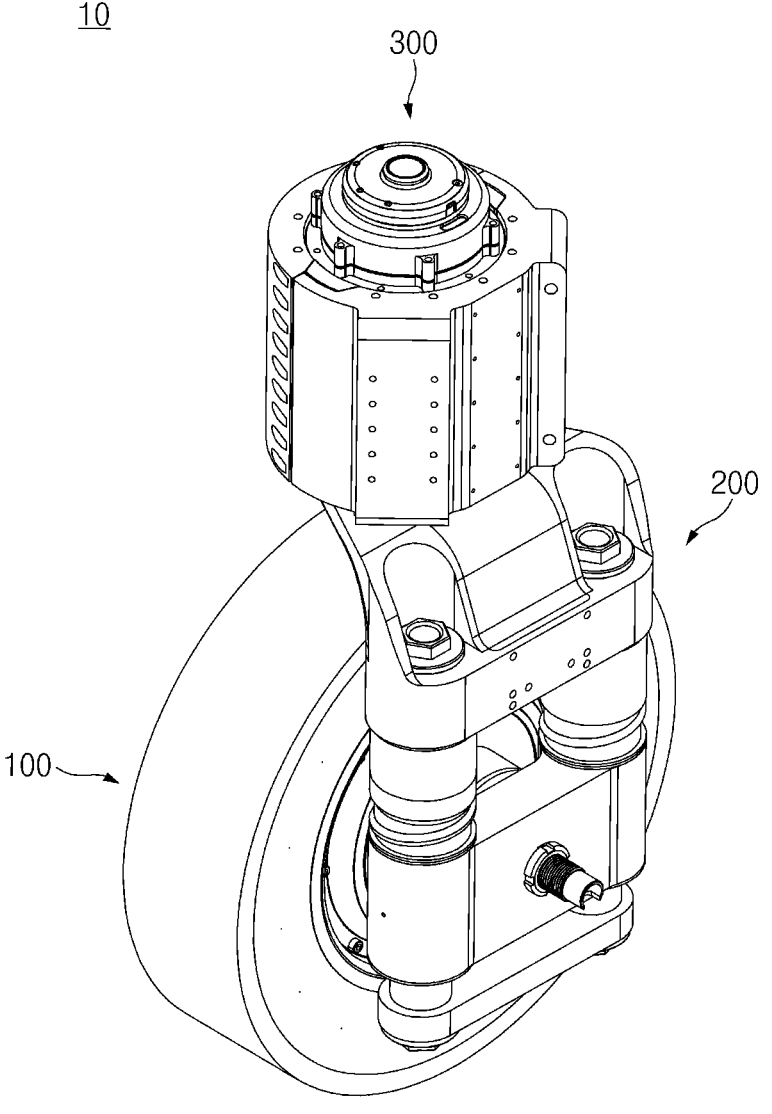
FIG. 1 is a perspective view illustrating a structure of a driving module according to embodiments of the present disclosure.
Figure 2:
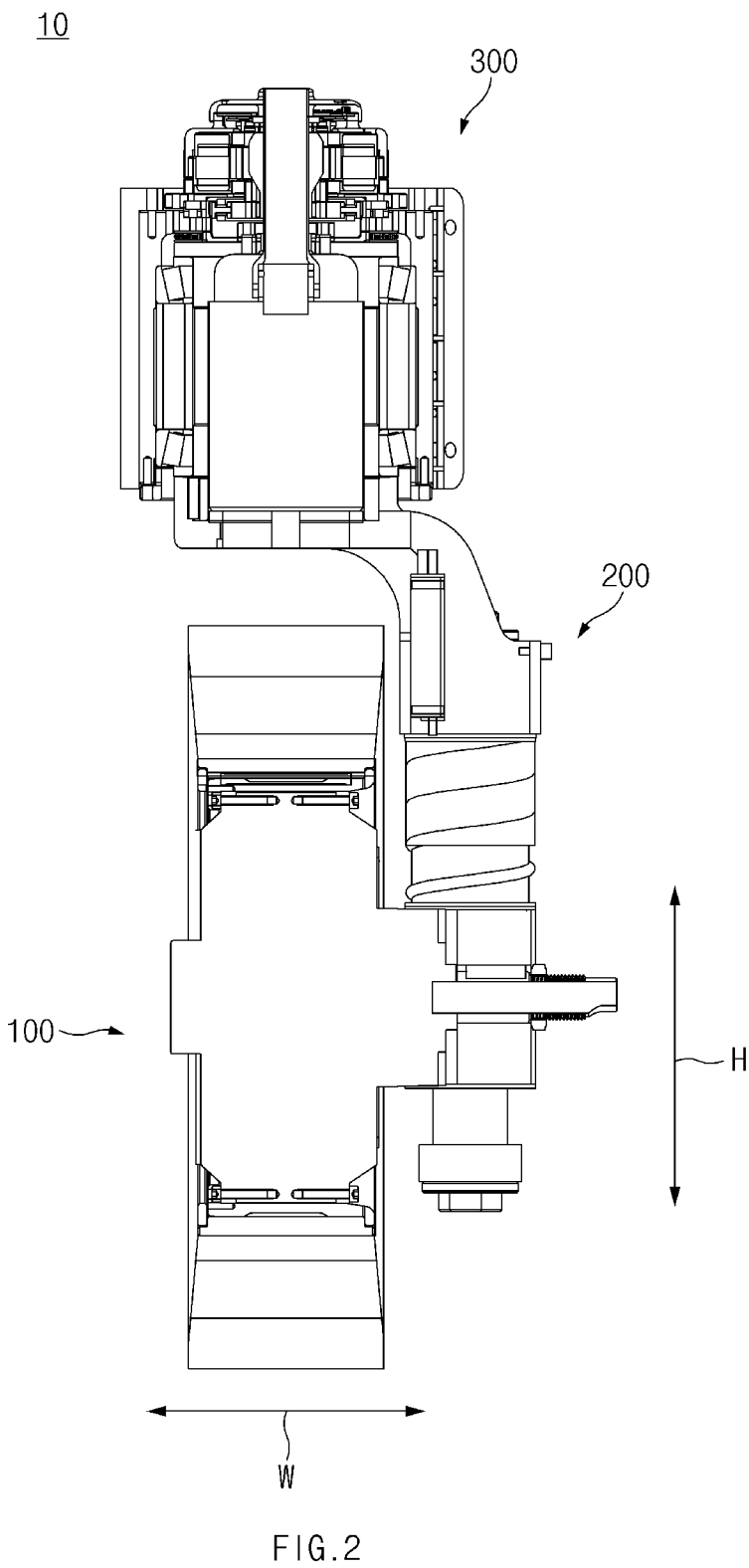
FIG. 2 is a vertical cross-sectional view illustrating the structure of the driving module according to embodiments of the present disclosure.
Figure 3:
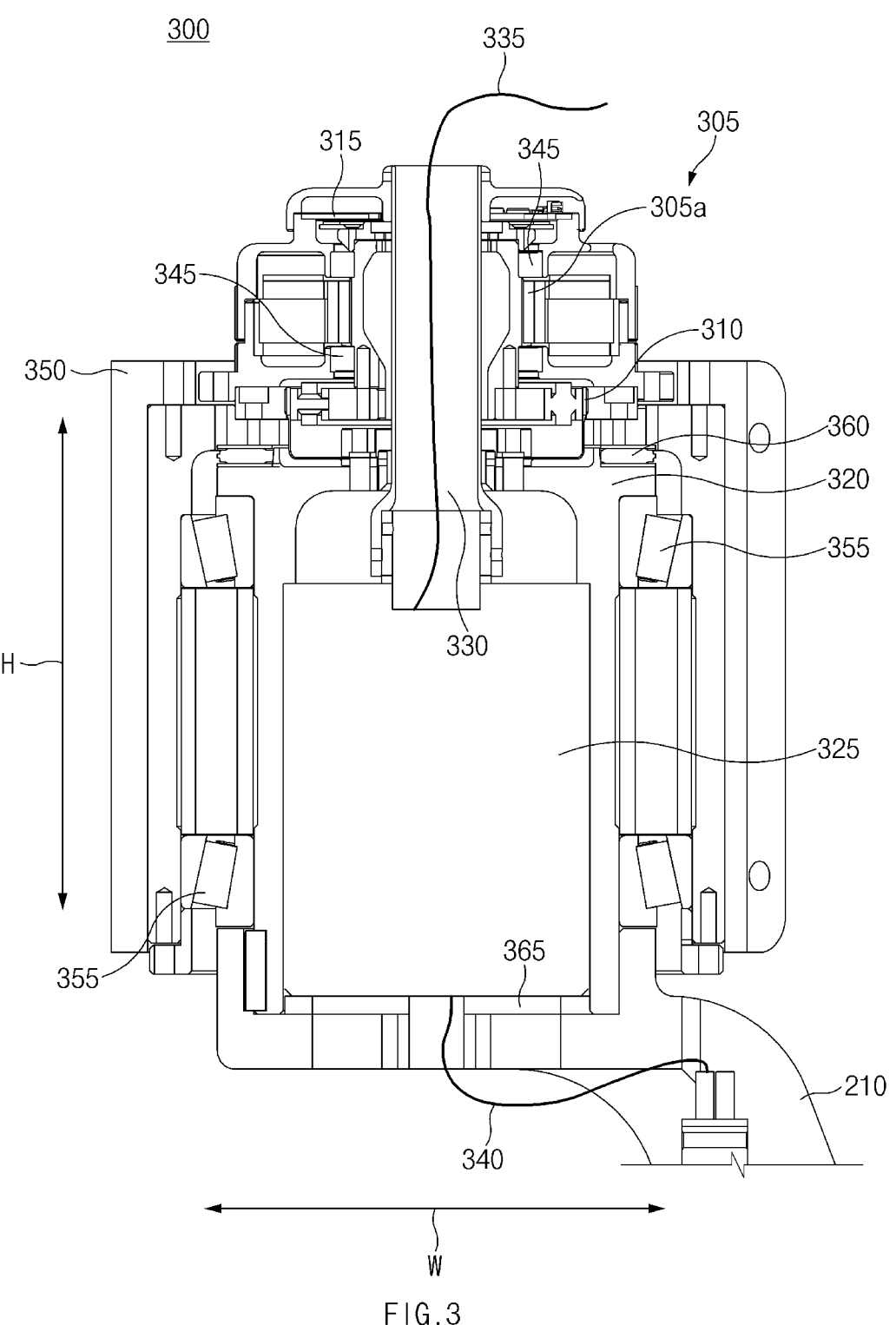
FIG. 3 is a vertical cross-sectional view illustrating a structure of a steering unit of the driving module according to embodiments of the present disclosure.
Figure 4:
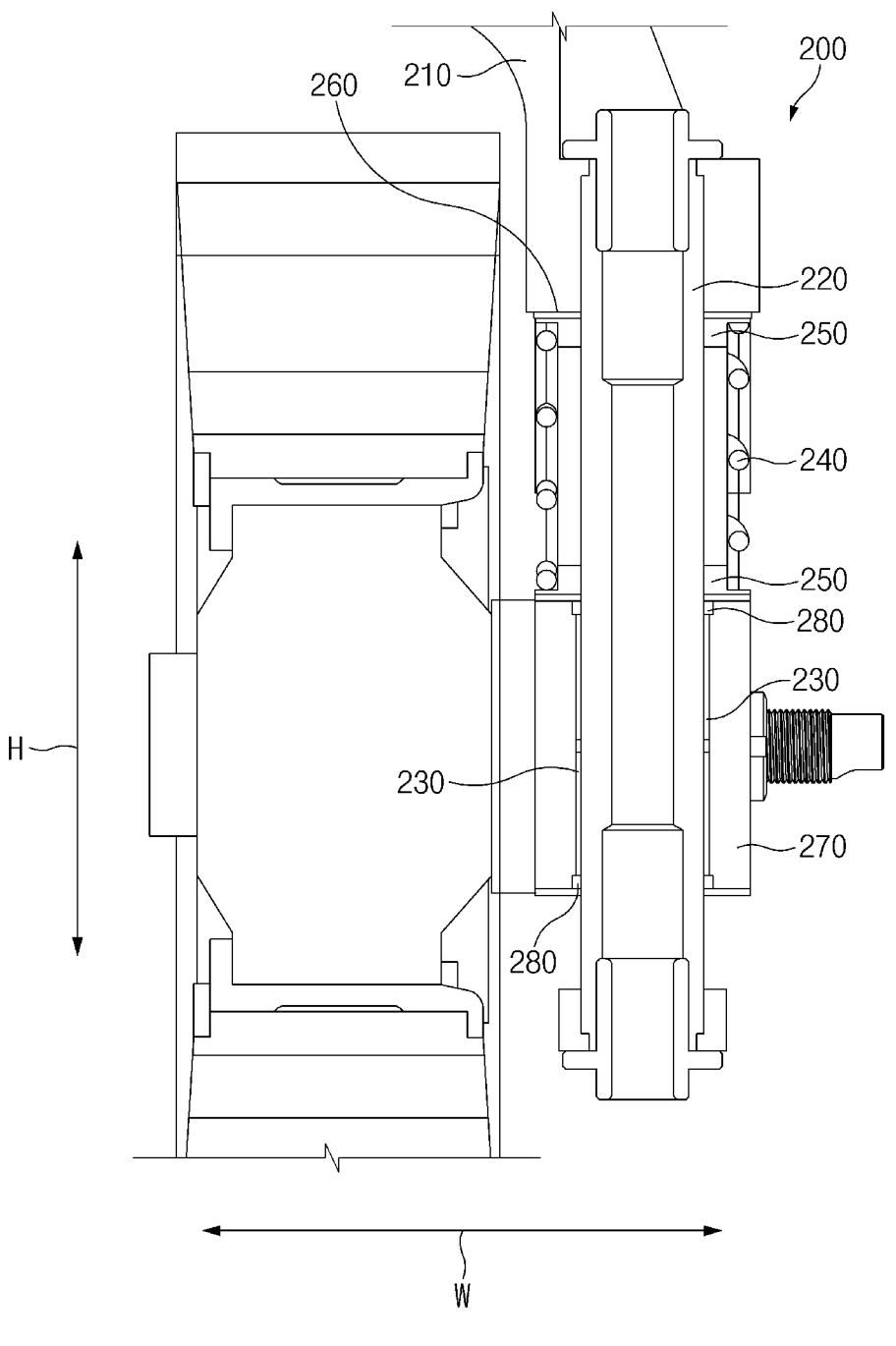
FIG. 4 is a vertical cross-sectional view illustrating a cross-sectional structure of a suspension unit of the driving module according to embodiments of the present disclosure when viewed in a forward/rearward direction.
Figure 5:
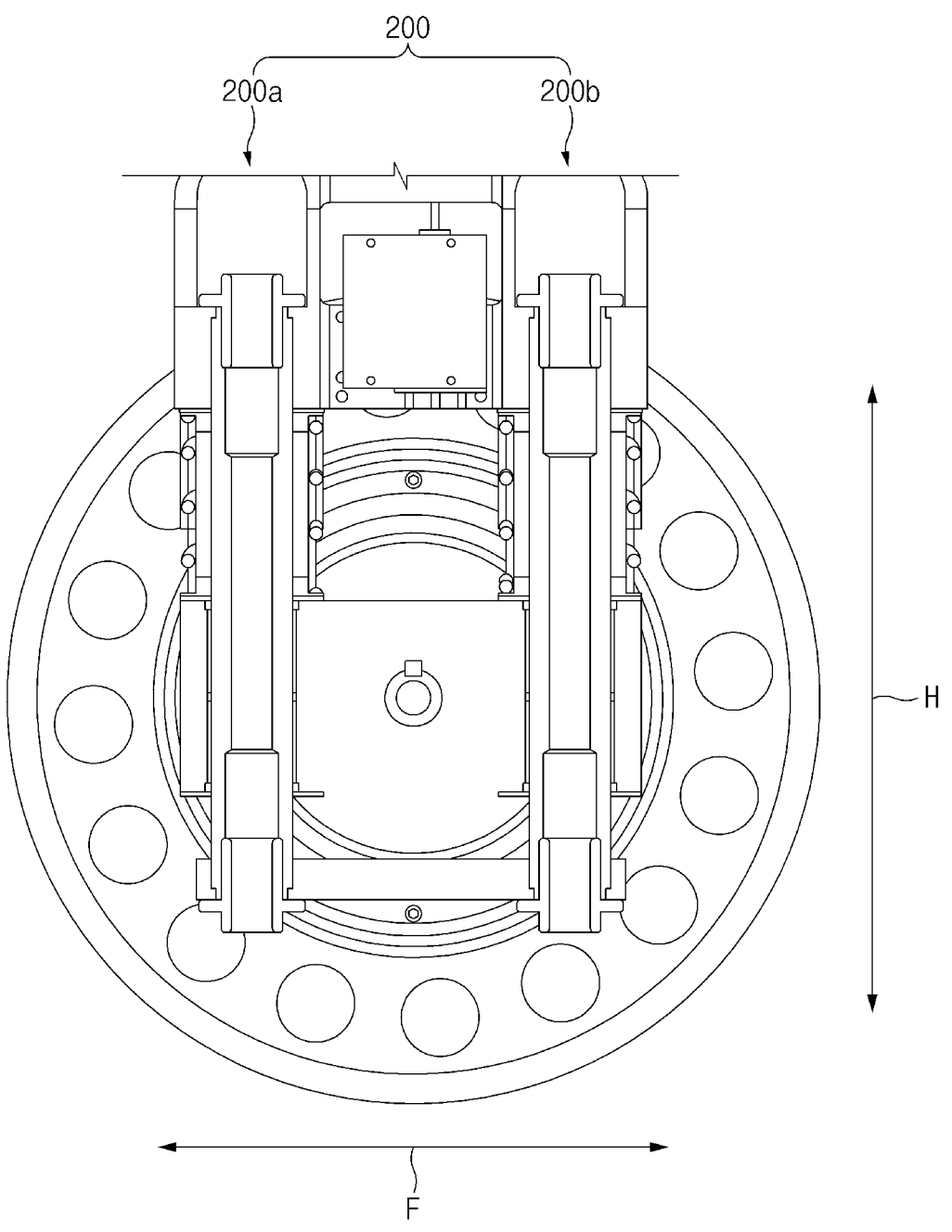
FIG. 5 is a vertical cross-sectional view illustrating a cross-sectional structure of the suspension unit of the driving module according to embodiments of the present disclosure when viewed in a leftward/rightward direction.
Figure 6:
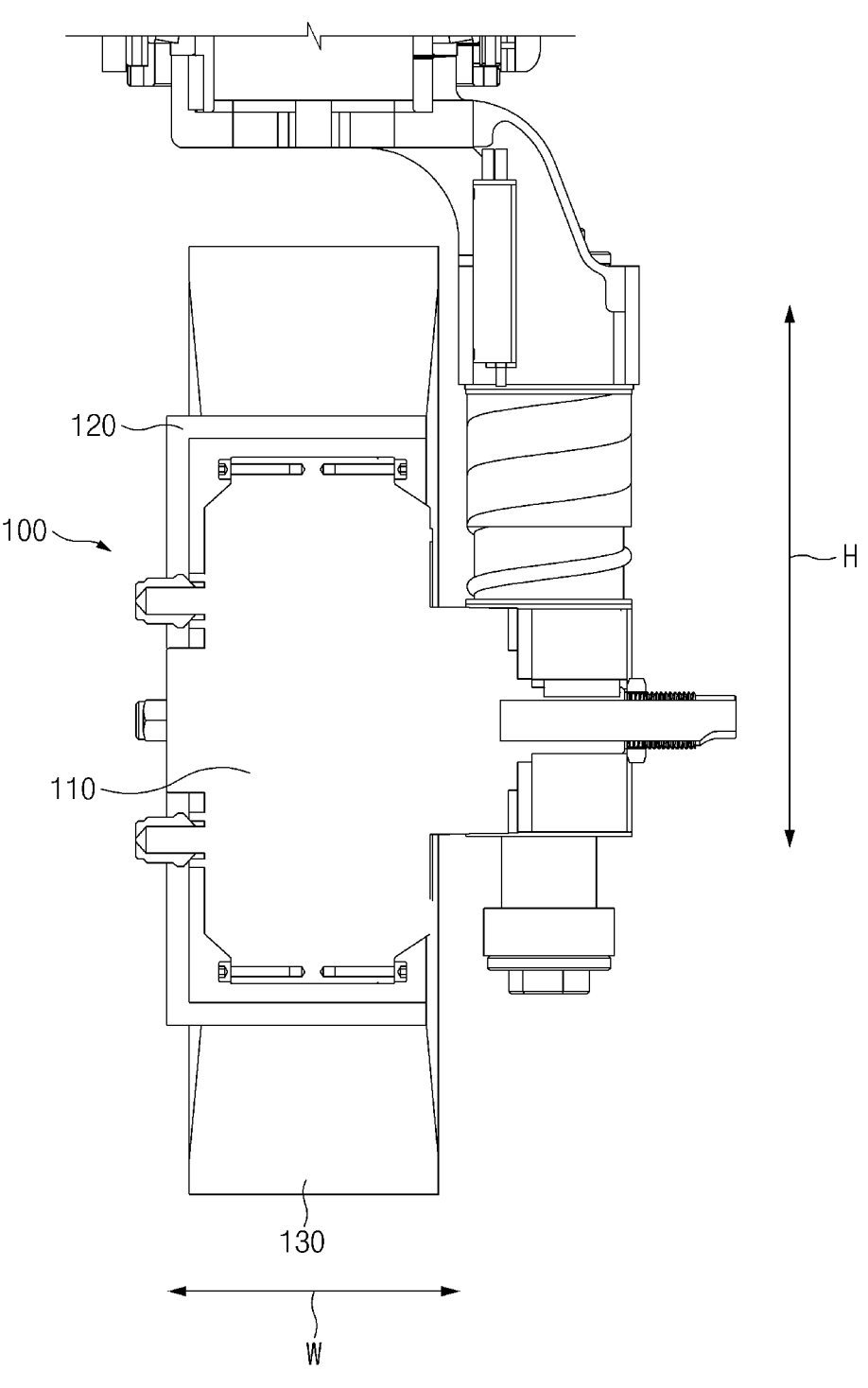
FIG. 6 is a vertical cross-sectional view illustrating a structure of a drive unit of the driving module according to embodiments of the present disclosure.

FIG. 1 is a perspective view illustrating a structure of a driving module according to embodiments of the present disclosure, and FIG. 2 is a vertical cross-sectional view illustrating the structure of the driving module according to embodiments of the present disclosure. FIG. 3 is a vertical cross-sectional view illustrating a structure of a steering unit of the driving module according to embodiments of the present disclosure, and FIG. 4 is a vertical cross-sectional view illustrating a cross-sectional structure of a suspension unit of the driving module according to embodiments of the present disclosure when viewed in a forward/rearward direction. FIG. 5 is a vertical cross-sectional view illustrating a cross-sectional structure of the suspension unit of the driving module according to embodiments of the present disclosure when viewed in a leftward/rightward direction, and FIG. 6 is a vertical cross-sectional view illustrating a structure of a drive unit of the driving module according to embodiments of the present disclosure.

Referring to the drawings, a driving module 10 according to embodiments of the present disclosure may include a drive unit 100 including a driving wheel 130 and a drive motor 110 configured to operate the wheel 130, a suspension unit 200 having one side coupled to the drive unit 100 and configured to absorb impact and vibration transmitted through the wheel 130 from the outside, and a steering unit 300 configured to steer the wheel 130 and having one side coupled to the other side of the suspension unit 200. That is, according to embodiments of the present disclosure, the driving module 10 may be configured such that the drive unit 100 may be coupled to one side of the suspension unit 200 and the steering unit 300 may be coupled to the other side of the suspension unit 200 in a state in which the suspension unit 200 is interposed between the drive unit 100 and the steering unit 300. For example, as illustrated in FIGS. 1 and 2, the drive unit 100 may be disposed in a lower region based on an upward/downward direction H, the suspension unit 200 may be disposed at one side of the drive unit 100 based on a leftward/rightward width direction W, and the steering unit 300 may be disposed in an upper region above the drive unit 100 and the suspension unit 200 based on the upward/downward direction H.

In more detail, according to an example of the present disclosure, as illustrated in FIGS. 1 and 2, the suspension unit 200 may be disposed adjacent to one side of the drive unit 100 based on the leftward/rightward width direction W. The steering unit 300 may be disposed above the drive unit 100 and overlap the wheel 130 or the drive unit 100 in the leftward/rightward width direction W.

More particularly, the suspension unit 200 may be disposed adjacent to one side of the drive unit 100 based on the leftward/rightward width direction W and provided at an inner side based on the leftward/rightward width direction W. Therefore, when the driving module 10 according to embodiments of the present disclosure is mounted in a mobility vehicle 1, i) it is possible to improve utilization of a space occupied by the driving module 10 in comparison with a case in which the suspension units are respectively disposed at two opposite sides of the drive unit based on the leftward/rightward width direction, ii) it is possible to increase rigidity against bending moment of force that is generated in the event of emergency braking of the mobility vehicle 1, and iii) it is possible to ensure ease of assembly because it is easy to disassemble the drive unit 100 including the wheel 130 from the suspension unit 200.

That is, a wheel house (not illustrated) configured to cover the driving module 10 needs to cover the driving module 10 including the wheel 130 regardless of a steering angle of the wheel 130. Therefore, the space occupied by the driving module 10 according to embodiments of the present disclosure may be remarkably reduced in comparison with the case in which the suspension units are respectively disposed at the two opposite sides of the drive unit based on the leftward/rightward width direction.

In contrast, according to another example of the present disclosure, the suspension units 200 may be respectively coupled to the two opposite sides of the drive unit 100 based on the leftward/rightward width direction W. In more detail, according to another example of the present disclosure, the suspension units 200 may be symmetric in the leftward/rightward width direction W.

Hereinafter, a detailed configuration of the steering unit 300 will be described with reference to FIG. 3.

The steering unit 300 may include a steering motor 305 including a steering rotary shaft 305*a*. The suspension unit 200 and the drive unit 100 may be steered as the steering rotary shaft 305*a* is rotated by the steering motor 305.

The steering unit 300 may include a speed reducer 310 coupled to the steering rotary shaft 305*a*. The speed reducer 310 may serve to reduce a rotation angular velocity of the steering rotary shaft 305*a* and then transmit power. For example, the speed reducer 310 may be a harmonic reducer, but the type of speed reducer is not limited thereto.

In addition, the steering unit 300 may further include an encoder 315 disposed at one side of the steering motor 305 and configured to detect a rotation of the steering rotary shaft 305*a*. In more detail, according to embodiments of the present disclosure, the encoder 315 may indirectly estimate a steering angle by detecting the rotation of the steering rotary shaft 305*a*. That is, a configuration in which the encoder is disposed at one side of the speed reducer 310 to estimate the steering angle may be considered. However, because a radius of the speed reducer 310 is relatively larger than a radius of the steering motor 305, the encoder 315 may be disposed at one side of the steering motor 305 and detect the rotation of the steering rotary shaft 305*a*, which makes it possible to reduce a size of the steering unit 300 in the leftward/rightward width direction W. For example, as illustrated in FIG. 3, the encoder 315 may be disposed in an upper region of the steering motor 305 based on the upward/downward direction H.

Referring to FIG. 3, the steering unit 300 may include an inner frame 320 having an internal space formed in the upward/downward direction H, and the inner frame 320 may rotate together with the speed reducer 310. In more detail, the inner frame 320 may be coupled to the speed reducer 310 and rotate together with the speed reducer 310 in conjunction with the rotation of the speed reducer 310.

Meanwhile, the inner frame 320 may have the internal space formed therein. In this case, the steering unit 300 may further include a slip ring 325 disposed in the internal space of the inner frame 320 and having one side coupled to the inner frame 320. The slip ring 325 may be fixedly coupled to one side of the inner frame 320 and rotate together with the inner frame 320 in conjunction with the rotation of the inner frame 320. As described below, the slip ring 325 may serve to prevent wires provided in the steering unit 300 from being twisted during a steering operation of the steering unit 300, thereby increasing an angle by which the steering module may steer the wheel. The description of the configuration and operational principle of the slip ring 325 may be replaced with the contents disclosed in the related art.

Referring to FIG. 3, the steering unit 300 may further include a hollow shaft 330 extending in the upward/downward direction H while penetrating the steering motor 305 and the speed reducer 310 and having a vacant space therein, and a first electric wire 335 connected to the slip ring 325 through the vacant space formed in the hollow shaft 330. In addition, the steering unit 300 may further include a second electric wire 340 connected to the slip ring 325 and extending from the slip ring 325 toward the suspension unit 200. The first electric wire 335 and the second electric wire 340 may be electrically connected through the slip ring 325.

According to embodiments of the present disclosure described above, the first electric wire 335 and the second electric wire 340 may be electrically connected to each other. Since the first electric wire 335 and the second electric wire 340 are electrically connected to each other through the slip ring 325, it is possible to prevent the electric wires 335 and 340 from being twisted regardless of a steering angle defined by the rotation of the steering motor 305. Therefore, according to embodiments of the present disclosure, the steering unit 300 may implement a steering angle of 360 degrees, which makes it possible to improve the steering performance of the driving module 10.

Meanwhile, as illustrated in FIG. 3, the steering unit 300 may further include a pair of steering bearings 345 configured to respectively support two opposite ends of the steering rotary shaft 305*a* based on a longitudinal direction of the steering rotary shaft 305*a*.

In addition, the steering unit 300 may further include an outer frame 350 disposed outside the inner frame 320 and configured to surround the inner frame 320. The outer frame 350 may be fixed regardless of the operation of the steering motor 305. In addition, the hollow shaft 330 may be fixedly coupled to the outer frame 350 and thus fixed regardless of the operation of the steering motor 305.

Meanwhile, the steering unit 300 may further include a first frame bearing 355 disposed between the inner frame 320 and the outer frame 350. The first frame bearing 355 may serve to support a load of the inner frame 320. In more detail, the first frame bearing 355 may be disposed outward in the leftward/rightward width direction W from the slip ring 325. The first frame bearing 355 may be provided as a pair of first frame bearings 355, and the pair of first frame bearings 355 may be spaced apart from each other in the upward/downward direction H. For example, the first frame bearing 355 may be a tapered bearing, but the type of first frame bearing 355 is not limited thereto.

Meanwhile, according to embodiments of the present disclosure, a central axis of the steering rotary shaft 305*a* and a central axis of the slip ring 325 are disposed coaxially, which makes it possible to simplify a structure of the steering unit 300 and reduce a height in the upward/downward direction H.

Meanwhile, the steering unit 300 may further include a second frame bearing 360 disposed in a region that is included in an upper region of the inner frame 320 and faces the outer frame 350 in the upward/downward direction H. Similar to the first frame bearing 355, the second frame bearing 360 may also serve to support a load of the inner frame 320. For example, the second frame bearing 360 may be disposed between an upper surface of the inner frame 320 and a lower surface of the outer frame 350.

In this case, according to embodiments of the present disclosure, as illustrated in FIG. 3, one partial region of the second frame bearing 360 may be disposed outward in the leftward/rightward width direction W from the speed reducer 310, and the other partial region of the second frame bearing 360 may be disposed inward in the leftward/rightward width direction W from the speed reducer 310.

Referring to FIG. 3, the steering unit 300 may further include a buffer member 365 disposed in a region that is included in a lower region of the inner frame 320 and faces the slip ring 325 in the upward/downward direction H. The buffer member 365 may serve to minimize transmission of impact to the steering unit 300, the impact being applied to the drive unit 100 including the wheel 130.

Meanwhile, the encoder 315 may be spaced apart upward from the steering bearing 345. In this case, a size of the steering unit 300 based on the leftward/rightward width direction W may be minimized.

Hereinafter, a detailed configuration of the suspension unit 200 will be described with reference to FIG. 4.

The suspension unit 200 may include a connection member 210 fixedly coupled to the lower region of the inner frame 320, a shaft member 220 coupled to a lower region of the connection member 210 and extending in the upward/downward direction H, a bushing member 230 into which the shaft member 220 is inserted, the bushing member 230 being movable in the upward/downward direction H along the shaft member 220, and a spring member 240 into which the shaft member 220 is inserted, the spring member 240 being disposed at an upper or lower side of the bushing member 230.

Since the connection member 210 is fixedly coupled to the inner frame 320, the connection member 210 may also rotate when the inner frame 320 is rotated by the operation of the steering motor 305 provided in the steering unit 300.

The shaft member 220 may be fixedly coupled to the connection member 210. Therefore, when the connection member 210 rotates, the shaft member 220 may also rotate together with the connection member 210 in conjunction with the rotation of the connection member 210.

The bushing member 230 may serve to support a bending load applied to the shaft member 220 and a load of the mobility vehicle equipped with the driving module 10 and also serve as a damper. In more detail, the bushing member 230 may move in the upward/downward direction H relative to the shaft member 220 but cannot rotate relative to the shaft member 220.

When the shaft member 220 is moved in the upward/downward direction H relative to the drive unit 100 by impact applied to the drive unit 100 including the wheel 130, the spring member 240 may be elastically deformed by absorbing a part of the impact.

Referring to FIG. 4, the suspension unit 200 may further include a guide member 250 disposed between the spring member 240 and the shaft member 220, and the shaft member 220 may be inserted into the guide member 250. A predetermined interval may be formed between the spring member 240 and the shaft member 220 in a radial direction of the shaft member 220. In this case, if the interval defines a vacant space, the spring member 240 may be bent. The guide member 250 may serve to prevent the spring member 240 from being bent, thereby preventing deformation of the spring member 240. For example, as illustrated in FIG. 4, the guide member 250 may be provided as a pair of guide members 250, and the pair of guide members 250 may be spaced apart from each other in the upward/downward direction H.

In addition, the suspension unit 200 may further include a buffer seat 260 disposed on a lower surface of the connection member 210 and facing the spring member 240 in the upward/downward direction H. The buffer seat 260 may serve to absorb external impact transmitted to the steering unit 300.

Meanwhile, the suspension unit 200 may further include a knuckle member 270 having one side coupled to the bushing member 230 and the other side coupled to the drive unit 100. The knuckle member 270 may be fixedly coupled to the bushing member 230. Therefore, when the bushing member 230 moves in the upward/downward direction H relative to the shaft member 220, the knuckle member 270 may also move in the upward/downward direction H. Therefore, the drive unit 100 coupled to the knuckle member 270 may also move in the upward/downward direction H.

Referring to FIG. 4, the suspension unit 200 may further include a sealing member 280 disposed between the bushing member 230 and the knuckle member 270. The sealing member 280 may serve to prevent foreign substances from entering the suspension unit 200.

Meanwhile, as illustrated in FIG. 5, the driving module 10 may include a plurality of suspension units 200. In more detail, the suspension units 200 may include a first suspension unit 200a and a second suspension unit 200b disposed rearward in a forward/rearward direction F from the first suspension unit 200a. The first and second suspension units 200a and 200b may have structures interchangeably identical to each other. Because the above-described contents related to the configuration of the suspension unit 200 may be equally applied to the first and second suspension units 200a and 200b, the description of the configurations of the first and second suspension units 200a and 200b may be replaced with the description of the suspension unit 200.

Meanwhile, the second electric wire 340 may sequentially penetrate an internal space of the shaft member 220 and an internal space of the knuckle member 270 and then be connected to the drive motor 110 of the drive unit 100 or a brake device (not illustrated). In this case, the brake device may be an electronic brake device.

Hereinafter, a detailed configuration of the drive unit 100 will be described with reference to FIG. 6.

The drive unit 100 may include a rim 120 connected to the drive motor 110 and the rotary shaft of the drive motor 110 and configured to transmit or receive power to or from the drive motor 110 and the rotary shaft, the rim 120 being rotatable together with the rotary shaft in conjunction with the rotation of the rotary shaft, and the wheel 130 being configured to surround an outer portion of the rim 120. For example, as illustrated in FIG. 6, the drive motor 110 may be an in-wheel motor disposed in an internal space in the rim 120 and the wheel 130. Alternatively, the drive motor 110 may be disposed outside the rim and the wheel.

Mobility Vehicle

Figure 7:
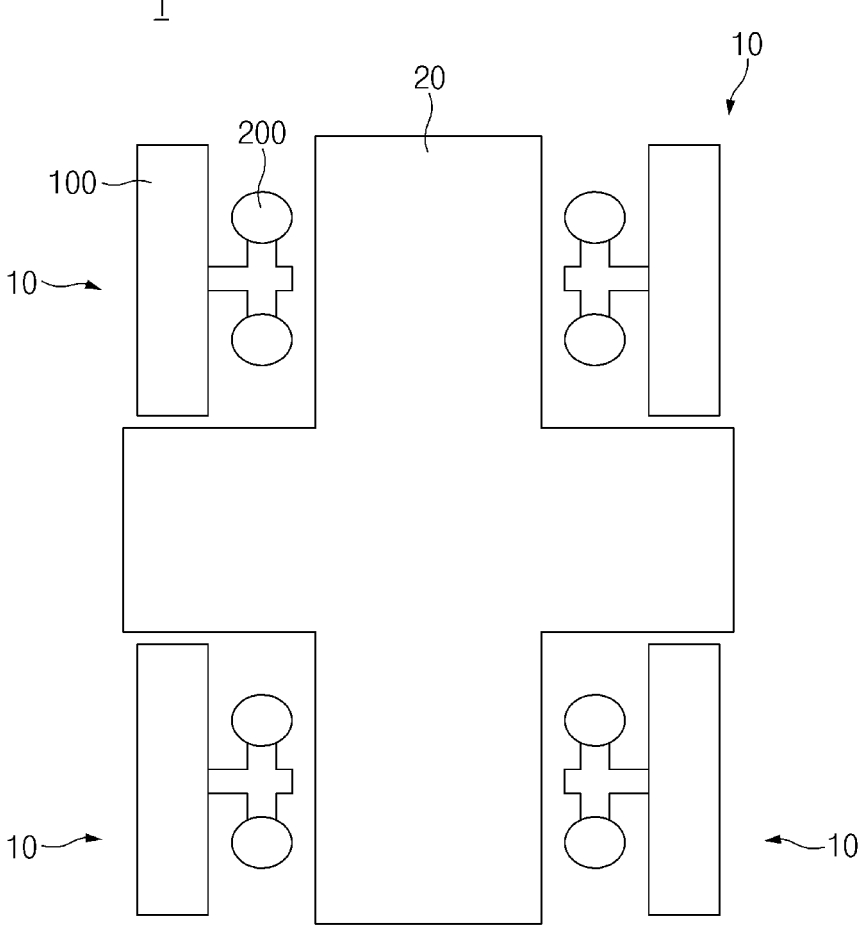
FIG. 7 is a top plan view schematically illustrating a state in which the driving module is coupled to a vehicle body of a mobility vehicle according to embodiments of the present disclosure.

FIG. 7 is a top plan view schematically illustrating a state in which the driving module is coupled to a vehicle body of the mobility vehicle according to embodiments of the present disclosure.

The mobility vehicle 1 according to embodiments of the present disclosure may include a vehicle body 20 configured to define a body of the mobility vehicle 1, and the driving modules 10 coupled to one side of the vehicle body 20.

In this case, referring to FIGS. 1 to 6, the driving module 10 may include the drive unit 100 including the driving wheel 130 and the drive motor 110 configured to operate the wheel 130, the suspension unit 200 having one side coupled to the drive unit 100, and the steering unit 300 configured to steer the wheel 130 and having one side coupled to the other side of the suspension unit 200.

In this case, according to embodiments of the present disclosure, the suspension unit 200 may be disposed adjacent to one side of the drive unit 100 based on the leftward/rightward width direction W and provided between the vehicle body and the drive unit 100 based on the leftward/rightward width direction W. For example, as illustrated in FIG. 7, the two driving modules 10 may be disposed at each of the front and rear sides of the vehicle body 20. However, as described above, the suspension units 200 may be respectively coupled to the two opposite sides of the drive unit 100 based on the leftward/rightward width direction W.

The description of the driving module 10 according to embodiments of the present disclosure described above with reference to FIGS. 1 to 6 may be equally applied to the mobility vehicle 1 according to embodiments of the present disclosure. Therefore, the description of the driving module 10 provided in the mobility vehicle 1 according to embodiments of the present disclosure may be replaced with the above-mentioned description of the driving module 10 according to embodiments of the present disclosure.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A driving module comprising:
a drive unit comprising a wheel and a drive motor configured to operate the wheel;
a suspension unit having a first side coupled to the drive unit; and
a steering unit configured to steer the wheel and having a side coupled to a second side of the suspension unit, wherein the steering unit comprises:
    a steering motor comprising a steering rotary shaft;
    a speed reducer coupled to the steering rotary shaft;
    an inner frame having an internal space formed through the inner frame in an upward/downward direction, the inner frame configured to rotate together with the speed reducer;
    a slip ring disposed in the internal space of the inner frame and having a side coupled to the inner frame;
    a first electric wire connected to the slip ring; and
    a second electric wire connected to the slip ring and extending from the slip ring to the suspension unit,
wherein the suspension unit comprises:
    a connection member fixedly coupled to a lower region of the inner frame;
    a shaft member coupled to a lower region of the connection member and extending in the upward/downward direction;
    a bushing member into which the shaft member is inserted, the bushing member being configured to be movable in the upward/downward direction along the shaft member; and
    a knuckle member having a first side coupled to the bushing member and a second side coupled to the drive unit, and
wherein:
    the second electric wire penetrates an internal space of the shaft member of the suspension unit and an internal space of the knuckle member of the suspension unit to connect to the drive unit, and
    the first electric wire and the second electric wire are connected in series through the slip ring in the steering unit.

2. The driving module of claim 1, wherein the suspension unit is disposed adjacent to a side of the drive unit based on a leftward/rightward width direction.

3. The driving module of claim 1, wherein the steering unit is disposed above the drive unit and overlaps the wheel in a leftward/rightward width direction.

4. The driving module of claim 1, wherein the steering unit further comprises an encoder disposed at a side of the steering motor and configured to detect a rotation of the steering rotary shaft.

5. The driving module of claim 4, wherein the steering unit further comprises a pair of steering bearings configured to respectively support two opposite ends of the steering rotary shaft based on a longitudinal direction of the steering rotary shaft.

6. The driving module of claim 4, wherein the encoder is spaced apart upward from a pair of steering bearings.

7. The driving module of claim 1, wherein the steering unit further comprises:

an outer frame disposed outside the inner frame and configured to surround the inner frame; and
a first frame bearing disposed between the inner frame and the outer frame, wherein the first frame bearing is disposed outward in a leftward/rightward width direction from the slip ring.

8. The driving module of claim 7, wherein:
the steering unit further comprises a second frame bearing disposed in a region that is included in an upper region of the inner frame and faces the outer frame in the upward/downward direction; and
a first partial region of the second frame bearing is disposed outward in the leftward/rightward width direction from the speed reducer and a second partial region of the second frame bearing is disposed inward in the leftward/rightward width direction from the speed reducer.

9. The driving module of claim 1, wherein a central axis of the steering rotary shaft and a central axis of the slip ring are coaxially arranged.

10. The driving module of claim 1, wherein the steering unit further comprises a buffer member disposed in a region that is included in the lower region of the inner frame and faces the slip ring in the upward/downward direction.

11. The driving module of claim 1, wherein:
the steering unit further comprises a hollow shaft having a vacant space therein and extending in the upward/downward direction while penetrating the steering motor and the speed reducer, and
the first electric wire is connected to the slip ring through the vacant space in the hollow shaft.

12. A driving module comprising:
a drive unit comprising a wheel and a drive motor configured to operate the wheel;
a suspension unit having a first side coupled to the drive unit; and
a steering unit configured to steer the wheel and having a side coupled to a second side of the suspension unit, the steering unit comprising:
    a steering motor comprising a steering rotary shaft;
    a speed reducer coupled to the steering rotary shaft;
    an encoder disposed at a side of the steering motor and configured to detect a rotation of the steering rotary shaft;
    an inner frame having an internal space formed through the inner frame in an upward/downward direction, the inner frame configured to rotate together with the speed reducer;
    a slip ring disposed in the internal space of the inner frame and having a side coupled to the inner frame;
    a hollow shaft having a vacant space therein and extending in the upward/downward direction while penetrating the steering motor and the speed reducer;
    a first electric wire connected to the slip ring through the vacant space in the hollow shaft; and
    a second electric wire connected to the slip ring and extending from the slip ring to the suspension unit,
wherein the suspension unit comprises:
    a connection member fixedly coupled to a lower region of the inner frame;
    a shaft member coupled to a lower region of the connection member and extending in the upward/downward direction;
    a bushing member into which the shaft member is inserted, the bushing member being configured to be movable in the upward/downward direction along the shaft member; and

a knuckle member having a first side coupled to the bushing member and a second side coupled to the drive unit, and wherein:

the second electric wire penetrates an internal space of the shaft member of the suspension unit and an internal space of the knuckle member of the suspension unit to connect to the drive unit, and the first electric wire and the second electric wire are connected in series through the slip ring in the steering unit.

13. The driving module of claim 12, wherein the suspension unit further comprises a spring member into which the shaft member is inserted, the spring member being disposed at an upper side or a lower side of the bushing member.

14. The driving module of claim 13, wherein:

the suspension unit further comprises a guide member disposed between the spring member and the shaft member; and the shaft member is inserted into the guide member.

15. The driving module of claim 13, further comprising a buffer seat disposed on a lower surface of the connection member and facing the spring member in the upward/downward direction.

16. The driving module of claim 13, wherein the suspension unit comprises:

a first suspension unit; and a second suspension unit disposed rearward from the first suspension unit.

17. The driving module of claim 12, wherein the suspension unit further comprises a sealing member disposed between the bushing member and the knuckle member.

* * * * *